UNITED STATES PATENT OFFICE.

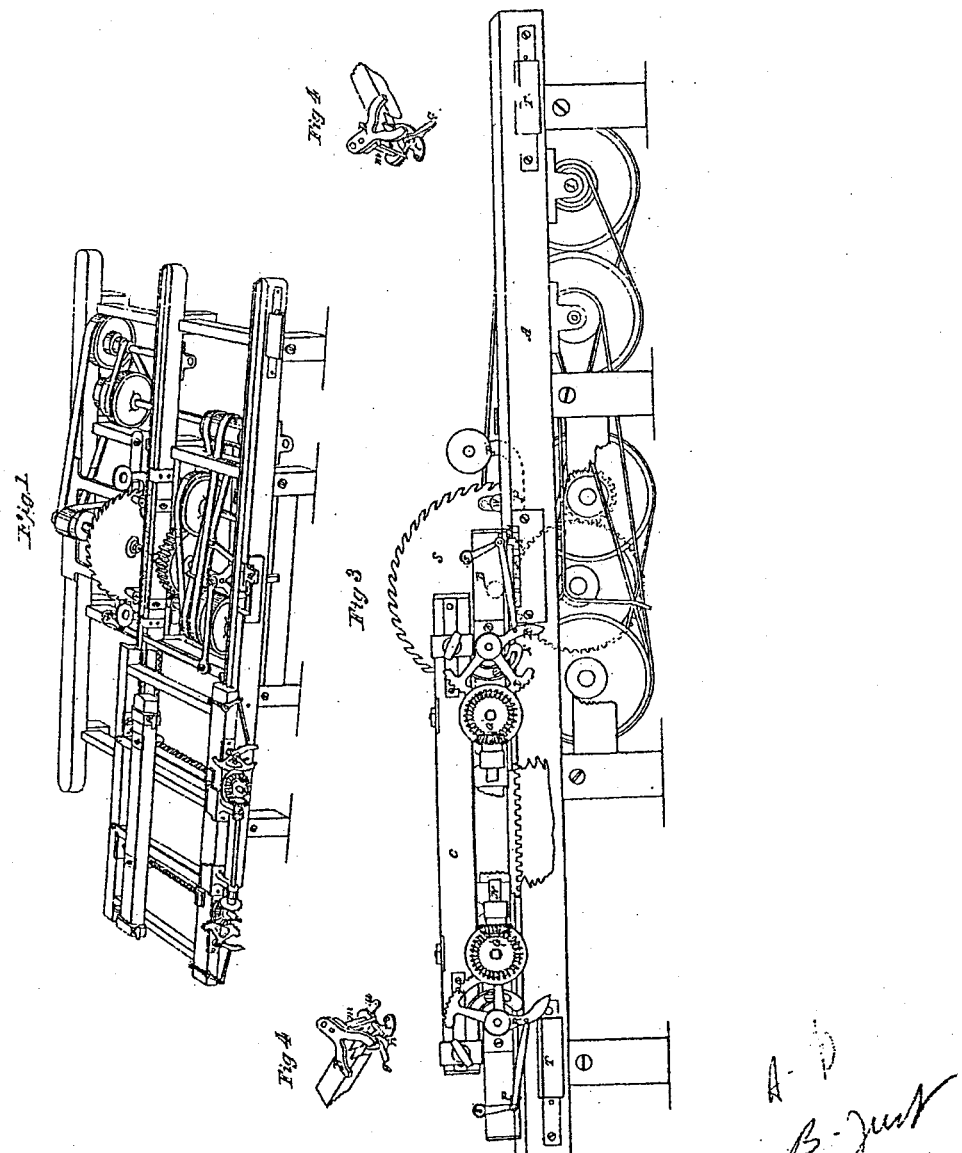

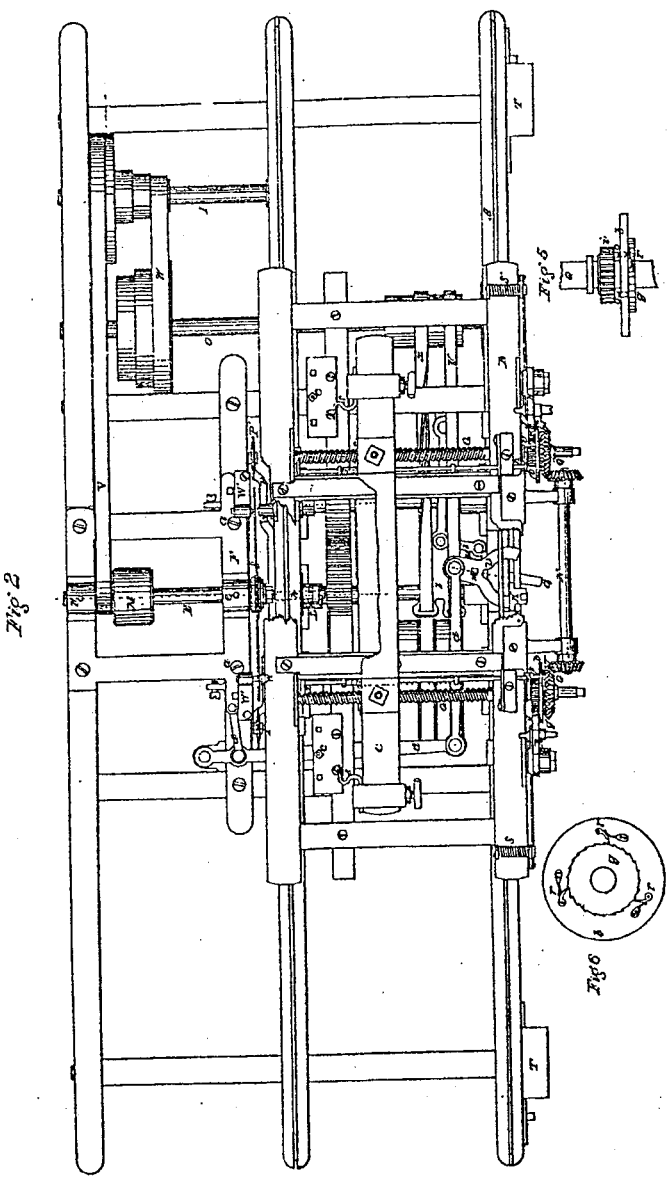

WILLIAM HAWKINS AND WILLIAM C. CLARY, OF MILWAUKEE, WISCONSIN.

IMPROVED SAWING-MILL.

Specification forming part of Letters Patent No. 19,774, dated March 30, 1858; Reissue No. 552, dated May 11, 1858.

*To all whom it may concern:*

Be it known that we, WILLIAM HAWKINS and WILLIAM C. CLARY, of Milwaukee, in the county of Milwaukee and State of Wisconsin, have invented new and useful Improvements in Machines for Sawing Lumber; and we do declare that the following is a full, clear, and exact description of the construction and operation of the same, reference being had to the annexed drawings, and to the letters of reference marked thereon, making a part of this specification, in which—

Figure 1 is a perspective view. Fig. 2 is a top view. Fig. 3 is a side view; Figs. 4 4, views of the double-acting lever; Figs. 5 and 6, views of the gearing and ratchet connected with the right and left hand screws.

In Figs. 2 and 3, A indicates the main frame to which all the working parts are attached. In Fig. 2, M marks the main belt, which rotates the saw-shaft E and gives the required power to cross-belt $x$ and open belt $y$, by connections of the intermediate belts and shafts, V I W O, moving the log-carriage B both ways. The cross-belt $x$ being on the tight pulley the log-carriage B moves in direction (see arrow, Fig. 2) until the log passes the saw, when the arm R comes in contact with the set-block T and turns up the segment of a gear, J, which by its connections rotates the screws G G and sets the log to the saw. The pin $p$ in the carriage B now moves the slide K, which turns the double-acting lever D, which, by its connections, sets the saw S oblique to the parallel line of the carriage the other way, and the wedge-roller P' is thrown out of the way, and wedge-roller P'' is thrown up. The belt-shipper $l$ being connected to the lever D, the cross-belt $x$ is thrown on the loose pulley, and open belt $y$ on the tight pulley moves the carriage B in the opposite direction and goes through the same operation before described. The saw-shaft E, Fig. 2, is hung in frame F being held down by bolts $a\ a\ a\ a$ in slots in frame F under bolt-heads, and swings on a pivot under bearing, $f$, at the outside end of frame F. The frame F, being connected, by levers $d\ d\ d$, to double-acting lever D, is moved so as to set the saw oblique and alternately to the parallel line of the carriage, so that the saw opposite the cutting-edge is clear of the log when cutting in either direction. Instead of changing the direction of the saw, the line of the carriage may be changed by equivalent means to those here set forth for changing the saw. The advantage of these improvements is, that a saw may be used that is thick in its center and thin on its cutting-edge, and not require set to the extent of its center thickness, thereby using a stiffer saw, cutting less saw-kerf, and using less power.

P, Fig. 2, is a lever which vibrates at its center $h$. On each end of this lever there are wedge-rollers P' P'', Figs. 2 and 3; or wedges may be attached to ends of lever P in place of wedge-rollers, to keep the board clear of saw S, and are changed alternately by arm L, which arm L is moved by pins C C; or it may be connected and worked by double-acting lever D.

W W, Fig. 2, are stationary guides made fast to main frame A.

W' W', Fig. 2, are swing-guides attached to frame A, said swing-guides being held to the saw by pins $e\ e$ in saw-frame F and operating in connection with the stationary guides to guide the saw.

The screws G G are right and left handed, which are connected to head-block C, which holds the log by dogs S S on the screws G G.

$i\ i$ are geared pinions.

$b\ b$ are ratchet-plates.

$g\ g$ are ratchet-wheels.

G' G' are bevel-gears.

The pinions $i\ i$ and ratchet-plates $b\ b$ being loose, the ratchet-wheels $g\ g$ and bevel-gears G' G' are made fast. The ratchet-plates $b$, Figs. 5 and 6, operate on ratchet-wheel $g$ by ratchets $r\ r\ r$, and pinion $i$, Fig. 5, operates plate $b$ by $o\ o$, which fit the holes made in plate $b$ when arm R, Fig. 3, comes in contact with set-block T, and turns the segment of a gear, J, which works in pinion $i$ and rotates screws G G, which are connected by shaft N. The pinion $i$, plate $b$, being loose lets the segment of a gear, J, drop back to its place, when the arm R leaves the set-block T ready to set again. The segment of a gear is changed by slide $t''$, to determine the degree or extent of set intended to be given; or arm R may be made to shift. The arm $v$ $v$, Fig. 2, on rods K K is connected to pinions $i\ i$. On the other end of rods $k$ are arms Z Z, so that when the log is sawed up the nuts or screws G G come in contact with arms Z Z, and, moving the rods K K and the arms $v\ v$, disconnect the pinions $i\ i$ from plates $b\ b$ and stops setting. The double-acting lever D, Figs. 4 4, is made fast to the top of shaft $m$, which works in bearings attached to frame A. The lower end of shaft $m$ is made fast to plate $t$ with notch $n$, to receive the latch $g$, connected to the angle lever $u$. The angle-lever $u$ swings on shaft $m$, and is connected with link $l'$. The latch $q$, being raised out of notch $n$ and moved around, shifts the belts $x$ and $y$ and stops the motion of the carriage B without changing the position of double-acting lever D.

Having thus described the construction and operation of our invention, what we claim as new, and desire to secure by Letters Patent, is—

1. Changing the saw after each cut alternately from an oblique position in one direction to an oblique position in a contrary direction to the line of the log-carriage while cutting in either direction by the movements of the machine, and for the purposes herein set forth.

2. The swing-guides W' W', in combination with the stationary guides W W, for the purpose of guiding the saw, as described.

3. The two wedge-rollers or wedges P' and P'', to keep the board clear of the saw while cutting in either direction, as described.

4. The combination of pinions $i$ and their pins $o$, entering into recesses of plates $b$, the ratchet-wheels $g$, the ratchets $r$, the adjustable segments J, the wheels G', the screws G, and the rods K, with their clutches $z$ and $v$, for the purpose of setting the log to the saw and stopping the setting when the log-frame advances too close to the saw.

5. The notched plate $t$, in combination with the latch $g$, lever $u$, and link $l$, for the purpose of operating the belt-shifter $l$ without turning the lever D, substantially as set forth.

Milwaukee, April 14, 1858.

WILLIAM HAWKINS.
WILLIAM O. CLARY.

Witnesses:
ALBERT SMITH,
FRANK A. SMITH.